United States Patent
Sakata et al.

(10) Patent No.: US 7,292,532 B2
(45) Date of Patent: Nov. 6, 2007

(54) TRAFFIC SHAPING APPARATUS AND TRAFFIC SHAPING METHOD

(75) Inventors: Yoshihiko Sakata, Hadano (JP); Atsushi Anzai, Ebina (JP); Takeshi Aimoto, Sagamihara (JP); Hiroki Yano, Hadano (JP); Kaoru Okano, Ebina (JP)

(73) Assignee: Hitachi, Ltd., Tokyo (JP)

( * ) Notice: Subject to any disclaimer, the term of this patent is extended or adjusted under 35 U.S.C. 154(b) by 806 days.

(21) Appl. No.: 10/784,829

(22) Filed: Feb. 24, 2004

(65) Prior Publication Data

US 2004/0208123 A1  Oct. 21, 2004

(30) Foreign Application Priority Data

Feb. 25, 2003  (JP) .............................. 2003-047327

(51) Int. Cl.
H04L 12/56  (2006.01)
(52) U.S. Cl. .................... 370/230.1; 370/232; 370/235
(58) Field of Classification Search ............ 370/230.1, 370/232, 233, 234
See application file for complete search history.

(56) References Cited

U.S. PATENT DOCUMENTS

2003/0099200 A1* 5/2003 Kiremidjian et al. .... 370/230.1
2003/0123390 A1* 7/2003 Takase et al. ............ 370/230.1
2003/0123391 A1* 7/2003 Chen et al. .............. 370/230.1
2003/0165116 A1* 9/2003 Fallon et al. ............ 370/230.1

FOREIGN PATENT DOCUMENTS

| EP | 1 054 544 A2 | 11/2000 |
|----|--------------|---------|
| JP | 2000-49787   | 2/2000  |
| JP | 2000-332787  | 11/2000 |
| JP | 2001-326688  | 11/2001 |

* cited by examiner

Primary Examiner—Brian Nguyen
(74) Attorney, Agent, or Firm—Antonelli, Terry, Stout & Kraus, LLP.

(57) ABSTRACT

A traffic shaping apparatus calculates a minimum transmission interval, an allowed transmission frame rate of a user frame, and a reference transmission interval for each user according to a minimum transmission frame rate and a peak transmission frame rate specified for each user. The traffic shaping apparatus also calculates a first estimated transmission time according to the reference transmission interval, and a second estimated transmission time according to the minimum transmission interval for each user. The traffic shaping apparatus determines the user having the earliest first estimated transmission time, and determines according to the second estimated transmission time of the user whether a user frame is to be transmitted.

20 Claims, 6 Drawing Sheets

TRAFFIC SHAPING APPARATUS AND TRAFFIC SHAPING METHOD

BACKGROUND OF THE INVENTION

The present invention relates to traffic shaping apparatuses and traffic shaping methods, and more particularly, to a traffic shaping apparatus and a traffic shaping method which effectively use a transmission frame rate in response to a change in transmission frame rates used by the users.

Before starting to use a public network (or public line) for communication, the user makes a contract with the administrator of the public network for a transmission frame rate, frame (packet) transfer priority, and others. After such a contract is exchanged between the user and the administrator of the public network, the user uses user terminals to start transmitting frames to the public network. A relay apparatus at the administrator side, positioned at the entrance of the public network, monitors the transmission frame rate of the user terminal, and if the contracted transmission frame rate is exceeded, lowers the frame priority of the violating user terminal or discards violating frames. This monitoring function of the public network is called a policing function or usage parameter control (UPC). Even if a frame is discarded during communication, the receiving terminal usually notices that the frame was discarded and requests the transmitting terminal to re-send the frame. Since the transmitting terminal re-sends the frame in response to this request, the finally received information has no omission. However, re-transmission may make a transfer delay very long, or resent frames may cause congestion in the network. Therefore, it is preferred that frame discarding not occur. It is necessary for a relay apparatus at the user side, which transmits frames to the public network, to control the transmission frame rate during frame transmission such that frames are not discarded in the public network. Such a function to control the transmission frame rate is called a traffic shaping function or simply a shaping function. A traffic shaping apparatus for implementing the traffic shaping function may be included in a relay apparatus directly connected to the public network and the user transmission terminal, such as those described above, or in a relay apparatus disposed at the exit of the public network to transmit frames to a private user network.

As such a shaping apparatus, an apparatus having a queue for high-priority packets and a queue for low-priority packets has been proposed. If there is no transmission-pending packet in a priority queue at the time of packet transmission from the priority queue, in order to effectively use the transmission frame rate, the shaping apparatus gives high priority to a transmission-pending packet in a non-priority queue and then sends it. Such a shaping apparatus is disclosed, for example, in EP Publication No. 1054544A2 (corresponding to Japanese Unexamined Patent Application Publication No. 2000-332787).

SUMMARY OF THE INVENTION

To implement the shaping function, the minimum transmission frame rate (MFR) and a peak frame rate (PFR) are specified for each user in a shaping apparatus in some cases. The hardware of the shaping apparatus recognizes the active state (while in transmitting a frame through a line) or the inactive (while not transmitting a frame) state of each user and dynamically calculates an allowed transmission frame rate (AFR), using the MFR and the PFR. The shaping apparatus determines the highest-priority transmission user according to an estimated transmission time A calculated from the AFR, and transmits a frame from the queue corresponding to the user when the estimated transmission time A arrives. The shaping apparatus does not transmit a frame until the estimated transmission time A arrives. In this way, the shaping apparatus transmits a frame when the estimated transmission time A arrives, to implement frame transmission based on the AFR.

Even when the frame rate which a user uses is lower than the calculated AFR in the shaping apparatus, because it does not mean that the user status becomes inactive, the AFR for the user does not change. Accordingly, the AFRs for the other users do not change either. Therefore, even after the above-user's frame rate becomes lower than the AFR, the other users can only use the same transmission frame rates as those used before the above-user's frame rate became lower than the AFR. In this case, there is some remaining frame rate which is not used by any user. For example, when user 1 has an MFR of 100 Mbps, user 2 has an MFR of 100 Mbps, and the maximum frame rate of the line is 1 Gbps, the AFR of each user is 500 Mbps. If the actual frame rate of user 1 is 300 Mbps, since the AFR of user 2 does not change from 500 Mbps, user 1 and user 2 use a total frame rate of only 800 Mbps in the line. Therefore, the remaining frame rate in the line, that is, 200 Mbps, is not used by any user. If the frame rate of user 1 is then reduced to 50 Mbps, which is lower than the MFR, the AFR of user 2 does not change from 500 Mbps. Therefore, both users use a total frame rate of only 550 Mbps in the line. The remaining frame rate, 450 Mbps, in the maximum frame rate of the line is not used by any user. In this way, if the frame rate of a user becomes lower than the AFR, or even lower than the MFR, no user can use the remaining frame rate obtained by subtracting the actual user frame rate from the AFR. Thus, the frame rate of the line is not effectively used.

If the AFR of a user exceeds the PFR, since no user can use a frame rate higher than the PFR in the shaping apparatus, the shaping apparatus reduces the AFR to the PFR. Also in this case, since the AFRs of the other users do not change, a frame rate which cannot be used by any user is left. When user 1 has an MFR of 100 Mbps, user 2 has an MFR of 100 Mbps, and the maximum frame rate of the line is 1 Gbps as in the above example, for example, the AFR of each user is 500 Mbps. If the PFR of user 1 is 300 Mbps and the PFR of user 2 is 1 Gbps, the AFR of user 1 is not 500 Mbps but is set to 300 Mbps, which is the same as the PFR. Therefore, the sum of the AFR of user 1 and the AFR of user 2 is 800 Mbps; in other words, the total frame rate which user 1 and user 2 can use is 800 Mbps. The remaining frame rate, 200 Mbps, in the maximum frame rate of the line is not used by any user. In this way, if the AFR of a user exceeds the PFR, no user can use the remaining frame rate obtained by subtracting the PFR from the AFR. Thus, the frame rate is not effectively used.

Accordingly, it is an object of the present invention to provide an apparatus and method which effectively use a frame rate left unused due to a change in the frame rates of the users.

Another object of the present invention is to provide an apparatus and method which use a frame rate not used by any user when the frame rate of one user becomes lower than the allowed frame rate (AFR).

Still another object of the present invention is to provide an apparatus and method which use a frame rate not used by any user when the allowed frame rate (AFR) of one user exceeds the peak frame rate (PFR).

An object of the present invention is achieved in one aspect of the present invention through the provision of a traffic shaping apparatus for controlling an allowed transmission frame rate of user frames according to frame rates specified in advance for each user who transmits and receives the user frames through a network. The traffic shaping apparatus includes a plurality of frame queues, each provided for a corresponding user, for storing the user frames of the corresponding user; a frame-rate storage section for storing a minimum transmission frame rate and a peak transmission frame rate specified for each user; a transmission-interval calculation section for calculating an allowed transmission frame rate of user frames for each user by using the minimum transmission frame rate or the peak transmission frame rate, for calculating a reference transmission interval of the user frames for each user by using the calculated allowed transmission frame rate, and for calculating a minimum transmission interval for each user by using the peak transmission frame rate; a transmission-interval storage section for storing the reference transmission interval and the minimum transmission interval for each user; a time calculation section for calculating a first estimated transmission time for each user by using the reference transmission interval and for calculating a second estimated transmission time for each user by using the minimum transmission interval; a time storage section for storing the first estimated transmission time and the second estimated transmission time for each user; a determination section for determining the user having the earliest first estimated transmission time among one or more users corresponding to one or more frame queues where at least one user frame is stored, and for determining according to the second estimated transmission time of the determined user whether a user frame is to be transmitted; a frame reading section for reading the user frame from the frame queue corresponding to the determined user when the determination section has determined that the user frame of the determined user is to be transmitted; and a transmission section for transmitting the read user frame.

An object of the present invention is achieved in another aspect of the present invention through the provision of a traffic shaping method for controlling the transmission frame rates of user frames according to frame rates specified in advance for each user who transmits and receives the user frames through a network. The traffic shaping method includes the steps of setting a minimum transmission frame rate and a peak transmission frame rate for each user; calculating a minimum transmission interval for each user by using the peak transmission frame rate; calculating an allowed transmission frame rate of user frames for each user by using the minimum transmission frame rate or the peak transmission frame rate; calculating a reference transmission interval of the user frames for each user by using the allowed transmission frame rate; calculating a first estimated transmission time for each user by using the reference transmission interval; calculating a second estimated transmission time for each user by using the minimum transmission interval; receiving a user frame for each user and storing it in association with the user; determining the user having the earliest first estimated transmission time among one or more users for whom at least one user frame is stored; determining according to the second estimated transmission time of the determined user whether a user frame is to be transmitted; and transmitting the user frame of the determined user when it has been determined that the user frame of the determined user is to be transmitted.

An object of the present invention is achieved in yet another aspect of the present invention through the provision of a relay apparatus connected to a plurality of lines, for relaying frames between the lines. The relay apparatus includes a plurality of interface sections, each connected to at least one of the plurality of lines, for transmitting and receiving a frame to and from the line, the plurality of interface sections each including a frame buffer for temporarily storing the frame; a relay section connected to the plurality of interface sections, for determining the interface sections, connected to a line through which the frame is to be transmitted according to header information included in a frame received by the each interface sections, and for relaying the frame to the determined interface section; and a traffic shaping apparatus connected to at least one of the plurality of interface sections and to the relay section, for controlling an allowed transmission frame rate according to frame rates specified in advance for each user who transmits and receives a frame through a line, and for transmitting a frame. The traffic shaping apparatus includes a frame-rate storage section for storing a minimum transmission frame rate and a peak transmission frame rate specified for each user; a transmission-interval calculation section for calculating an allowed transmission frame rate of frames for each user by using the minimum transmission frame rate or the peak transmission frame rate, for calculating a reference transmission interval of the frames for each user by using the calculated allowed transmission frame rate, and for calculating a minimum transmission interval for each user by using the peak transmission frame rate; a transmission-interval storage section for storing the reference transmission interval and the minimum transmission interval for each user; a time calculation section for calculating a first estimated transmission time for each user by using the reference transmission interval and for calculating a second estimated transmission time for each user by using the minimum transmission interval; a time storage section for storing the first estimated transmission time and the second estimated transmission time for each user; a determination section for determining the user having the earliest first estimated transmission time among one or more users for whom at least one frame is stored in the frame buffer, and for determining whether a frame is to be transmitted according to the second estimated transmission time of the determined user; a frame reading section for reading the frame of the determined user from the frame buffer when the determination section has determined that the frame of the determined user is to be transmitted; and a transmission section for transmitting the read frame to one of the lines through one of the plurality of interface sections.

DESCRIPTION OF THE PREFERRED EMBODIMENTS

Figure 1:
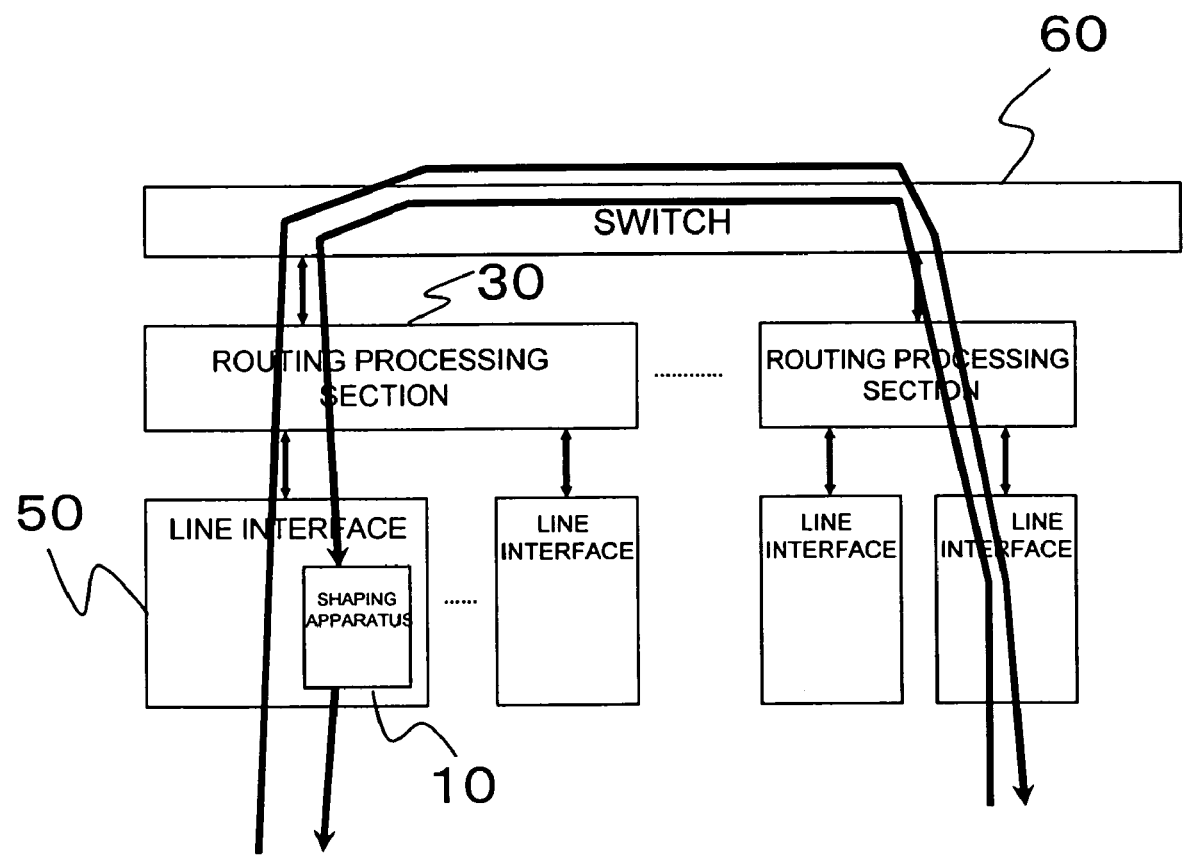
FIG. 1 is a view showing an example structure of a packet relay apparatus provided with shaping apparatuses according to an embodiment of the present invention.

FIG. 1 shows an example structure of a packet relay apparatus having shaping apparatuses.

The packet relay apparatus is formed of a plurality of line interfaces 50, a plurality of routing processing sections 30, and at least one switch 60. At least one line interface 50 has a shaping apparatus 10.

Each line interface 50 is connected to one line or a plurality of lines. The line interface 50 is provided with a physical-layer handling section, and performs frame (packet) input and output operations through the physical-layer handling section to and from a connected line. Each routing processing section 30 is connected to one or more line interfaces 50 and to the switch 60. The routing processing section 30 receives a frame from the connected line interface 50, determines the routing destination of the frame according to the destination address included in the frame, and relays the frame to the switch 60 or to any of the line interfaces 50. The switch 60, when it receives the frame from the routing processing section 30, relays the frame according to the routing destination determined by the routing processing section 30 to an appropriate routing processing section 30.

The shaping apparatus 10 is disposed in at least one line interface 50. The shaping apparatus 10 receives a frame from the routing processing section 30, checks header information in the frame to determine the user of the frame, and transmits the frame according to an allowed transmission frame rate (AFR) specified or calculated for each user.

When the packet relay apparatus shown in FIG. 1 is disposed in a network, a frame rate assigned to each user can be controlled in the network by the function of the shaping apparatuses 10. The packet relay apparatus can have any appropriate structure other than that shown in FIG. 1.

Figure 2:
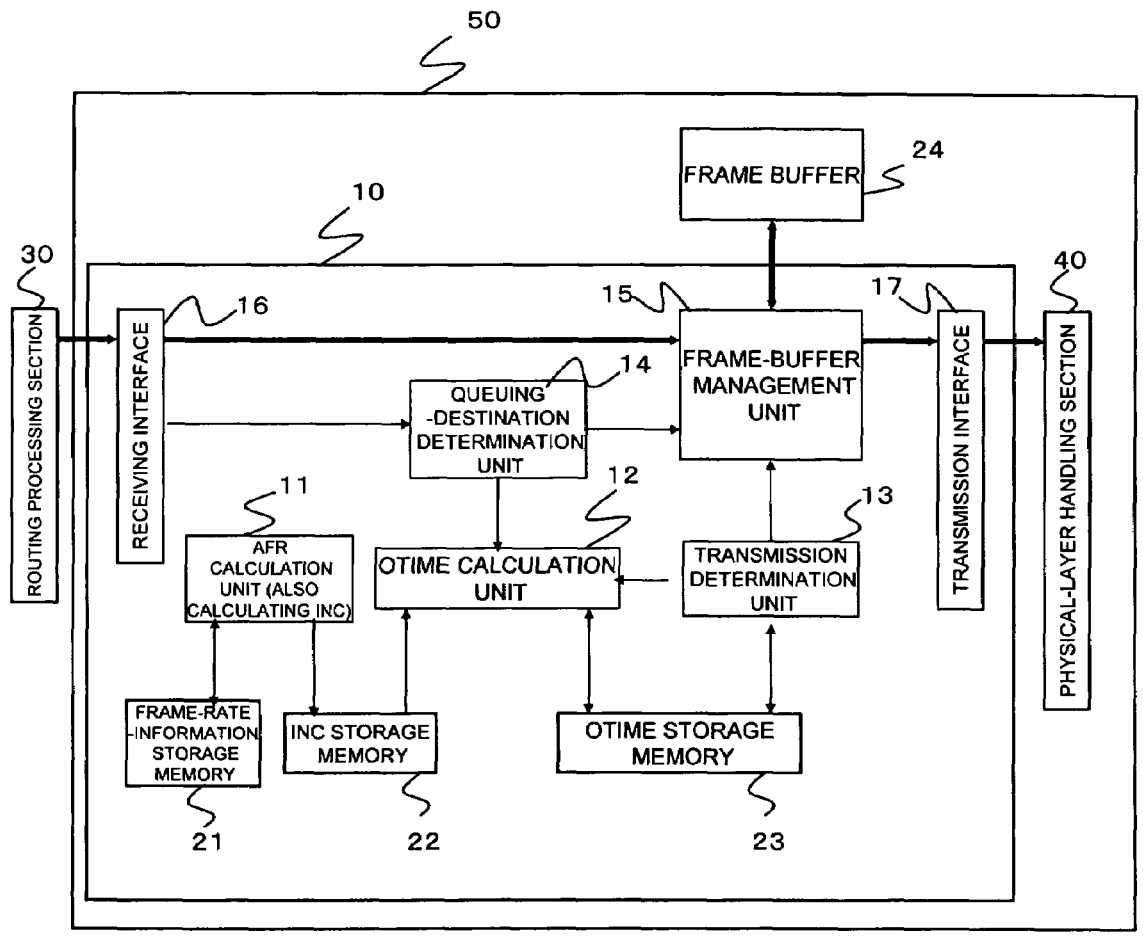
FIG. 2 is a structural view of a shaping apparatus.

FIG. 2 shows the structure of the shaping apparatus 10. The shaping apparatus 10 is provided with an AFR calculation unit 11, an estimated-transmission-time (OTIME) calculation unit 12, a transmission determination unit 13, a queuing-destination determination unit 14, a frame-buffer management unit 15, a receiving interface 16, and a transmission interface 17. The shaping apparatus 10 is also provided with a frame-rate-information storage memory 21, a reference-transmission-interval (INC) storage memory 22, and an OTIME storage memory 23. The shaping apparatus 10 is connected to a frame buffer 24 having a queue for each user and to a physical-layer handling section 40, both provided for the line interface 50, and is further connected to the routing processing section 30, which is outside the line interface 50. The frame buffer 24 and memories 21 to 23 may be provided outside the shaping apparatus 10. The frame buffer 24 and memories 21 to 23 may be implemented by a memory externally connected to the line interface 50. The frame buffer 24 may be internally provided in the shaping apparatus 10.

The shaping apparatus 10 shown in FIG. 2 can be made as a large-scale integration (LSI), such as an application specification integrated circuit (ASIC) or a field programmable gate array (FPGA). Such LSI is provided with the AFR calculation unit 11, the estimated-transmission-time (OTIME) calculation unit 12, the transmission determination unit 13, the queuing-destination determination unit 14, the frame-buffer management unit 15, the receiving interface 16, the transmission interface 17, and the OTIME storage memory 23. The LSI may also include the frame-rate-information storage memory 21 and the reference-transmission-interval (INC) storage memory 22.

The receiving interface 16 is connected to the routing processing section 30, which is outside the line interface 50, and receives a frame from the routing processing section 30. The receiving interface 16 sends the received frame to the frame-buffer management unit 15, and also sends the header information of the frame to the queuing-destination determination unit 14.

The queuing-destination determination unit 14 receives the header information of the frame from the receiving interface 16, and determines the queuing destination of the frame according to the received header information. For example, the queuing-destination determination unit 14 determines the queuing destination according to the value of VLAN ID included in the received header information. The queuing-destination determination unit 14 may determine the queuing destination according to appropriate information included in the header information, other than VLAN ID.

The frame-buffer management unit 15 receives the frame from the receiving interface 16, and writes the received frame at the end of the queue in the frame buffer 24 according to the queuing destination determined by the queuing-destination determination unit 14. The frame-buffer management unit 15 reads the transmission-pending frame disposed at the top of the queue of the user for whom the transmission determination unit 13 has decided to perform transmission, from the frame buffer 24, and transmits the frame through the transmission interface 17.

The frame buffer 24 has a plurality of queues where received frames are stored. A queue is provided for each user. The frame-buffer management unit 15 stores a frame received by the shaping apparatus 10 in the queue corresponding to the queuing destination determined by the queuing-destination determination unit 14. Frames stored in each queue are sequentially read and transmitted by the frame-buffer management unit 15.

The transmission interface 17 is connected to the physical-layer handling section 40 located in the line interface 50, and transmits a frame sent from the frame-buffer management unit 15 to the physical-layer handling section 40.

The frame-rate-information storage memory 21 stores a minimum transmission frame rate (MFR) and a peak transmission frame rate (PFR) specified in advance, as well as the AFR calculated by the AFR calculation unit 11, for each user. The frame-rate-information storage memory 21 may further store the maximum frame rate of the line used. The INC storage memory 22 stores a reference transmission interval (INC) based on the AFR and the minimum transmission interval (PINC) based on the PFR calculated by the AFR calculation unit 11, for each user. The OTIME storage memory 23 stores, for each user, a first estimated transmission time A for heap tournament and a second estimated transmission time P for transfer check calculated by the OTIME calculation unit 12, and a flag indicating whether there is a transmission-pending frame for each user. The flag indicating whether there is a transmission-pending frame is appropriately written, for example, by the frame-buffer management unit 15 or other units.

The AFR calculation unit 11 dynamically calculates the AFR and INC for each user periodically according to the MFR and/or PFR stored in advance in the frame-rate-information storage memory 21. The AFR calculation unit 11 also stores the results of calculation in the INC storage memory 22 in association with each user.

The users here do not mean individual terminals or terminal users themselves but represent line-contracting parties, such as individuals, corporate bodies, organizations, or associations. The users can be distinguished, for example, by VLAN IDs.

The AFR calculation unit 11 will be described below in detail.

For example, the AFR calculation unit 11 reads the MFR and PFR for each user stored in advance in the frame-rate-information storage memory 21 and uses the following expression to calculate the AFR:

AFR=(maximum frame rate of the line used by the user) ×(user MFR)/(sum of the MFRs of active users on the line)

The maximum frame rate of the line is specified in advance and stored in an appropriate memory.

When it is assumed that the maximum frame rate of the line used by user 1 and user 2 is 1 Gbps, the MFR of user 1 is 100 Mbps, and the MFR of user 2 is 400 Mbps, for example, these values are substituted in the above expression to calculate the AFR of each user, as follows:

AFR of user 1=1Gbps×100Mbps/(100Mbps+ 400Mbps)=200Mbps

AFR of user 2=1Gbps×400Mbps/(100Mbps+ 400Mbps)=800Mbps

The maximum frame rate of the line is divided and assign to each user according to the ratio of the MFRs, as shown in the calculation results. If the calculated AFR exceeds the read PFR, that is, the peak frame rate of the user, the AFR calculation unit 11 sets the AFR to the PFR. In the above AFR calculation example, the calculation is performed such that the maximum frame rate of the line is divided and assigned according to the MFR of each user. The AFR may be obtained according to an appropriate calculation expression other than that used above.

The AFR calculation unit 11 further calculates the INC by using the following expression:

INC=(maximum frame rate which the shaping apparatus can shape)/AFR

The PINC is calculated according to the following expression. When the PFR is specified for each user, the PINC is calculated and stored in the INC storage memory 22 prior to the calculation of the INC.

PINC=(maximum frame rate which the shaping apparatus can shape)/PFR

The maximum frame rate which the shaping apparatus can shape is the sum of the maximum frame rates of one or more lines connected to the shaping apparatus 10. The shaping apparatus 10 has a shaping capability of controlling the maximum frame rates of all the connected lines. The INC indicates the transmission interval used when a frame is transmitted at the AFR. Usually, the shaping apparatus calculates, for each user, a first estimated transmission time A when the next frame is to be transmitted, by using the INC. When the first estimated transmission time A matches the current time, or indicates a time in the past compared with the current time, the shaping apparatus transmits a frame of the user.

The PINC indicates the transmission interval used when a frame is transmitted at the PFR. The AFR becomes lower than the PFR in many cases due to the relationship with other active users. Even when the user frame rate becomes lower than the AFR, it does not mean that the user status becomes inactive. Therefore, the AFRs of the other users do not change. Consequently, the frame rate obtained by subtracting the user frame rate lower than the AFR from the AFR is not used by any user, which means that the frame rate is not effectively used. If the shaping apparatus can transmit a frame by using a frame rate higher than the AFR but lower than the PFR in this case, the frame rate of the line is effectively used. The PINC indicates the timing when the user can transmit a frame if the other users are not using the line.

The shaping apparatus 10 calculates a second estimated transmission time P according to the PINC, and transmits a frame at the second estimated transmission time P, which is earlier than the first estimated transmission time A, if the other users are not using the line. The shaping apparatus 10 can transmit a frame even after the second estimated transmission time P but before the first estimated transmission time A.

The OTIME calculation unit 12 calculates the first estimated transmission time A and the second estimated transmission time P according to the INC and PINC stored in the INC storage memory 22. For example, the OTIME calculation unit 12 reads the INC obtained according to the AFR and the PINC obtained according to the PFR from the INC storage memory 22, and uses the following expressions to calculate the first estimated transmission time A and the second estimated transmission time P.

First estimated transmission time $A$=(previous estimated transmission time)+INC Second estimated transmission time $A$=(previous estimated transmission time)+PINC The previous estimated transmission time can be obtained from a timer or counter disposed inside or outside the shaping apparatus 10. The OTIME calculation unit 12 stores the results of calculation in the OTIME storage memory 23 in association with each user.

When the queuing-destination determination unit 14 determines that a frame was received when there was no frame in the destination queue, the OTIME calculation unit 12 sets the first estimated transmission time A and the second estimated transmission time P to the earliest time when the received frame can be transmitted. For example, the first estimated transmission time A and the second estimated transmission time P can be set to the current time or the current time plus a reference time.

The reference time corresponds, for example, to "1" in the timer, and is calculated by using the following expression according to the maximum frame rate which the shaping apparatus 10 can shape and a reference number of bytes.

Reference time [s]=(reference number of bytes)×8 [bits]/(maximum frame rate [bps] which the shaping apparatus can shape)

The reference number of bytes is the number of bytes in a frame transmitted or received by the shaping apparatus 10. In other words, the shaping apparatus 10 can transmit a frame having the reference number of bytes within the reference time.

For example, when the maximum frame rate which the shaping apparatus 10 can shape is 1 Gbps and the reference number of bytes is 64, the reference time equals 64×8/(1 Gbps), which is 512 ns. The value is set to "1" in the timer. The shaping apparatus 10 can transmit a frame written in a queue of the frame buffer 24 at intervals corresponding to the reference time.

The transmission determination unit 13 determines a user having a transmission-pending frame in the queue and having the highest transmission priority by checking frames written in the frame buffer 24 according to the first estimated transmission time A calculated by the OTIME calculation unit 12. The transmission determination unit 13 also determines, according to the second estimated transmission time P calculated by the OTIME calculation unit 12, whether the determined user is ready to transmit. When the second estimated transmission time P matches the current time, or is in the past with respect to the current time, the transmission determination unit 13 instructs the frame-buffer management unit 15 to transmit the frame from the queue corresponding to the determined user.

Figure 3:
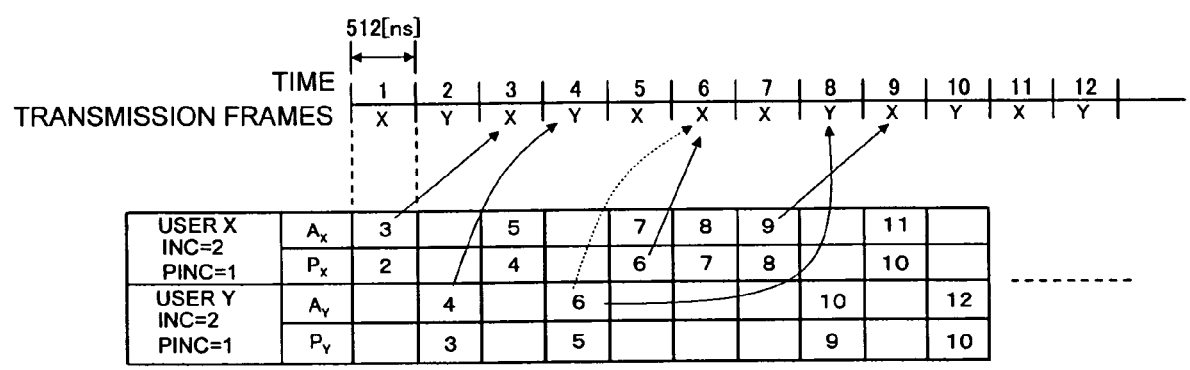
FIG. 3 is a view showing the relationship between estimated transmission time and frame transmission timing.

FIG. 3 shows the relationship between estimated transmission time and frame transmission timing.

It is assumed here, for example, that the shaping apparatus is connected to only one line, the maximum frame rate of the line is 1 Gbps, and user X and user Y each having a PFR of 1 Gbps and an MFR of 100 Mbps are both active. In this case, the PINC of each user is calculated according to the above-described expression, is found to be "1", and is stored in the. INC storage memory 22. The AFR of each user is calculated by the AFR calculation unit 11 according to the above-described expression, and found to be 500 Mbps. The INC of each user is calculated by the AFR calculation unit 11 and is found to be "2".

When the shaping apparatus 10 transmits a frame, the OTIME calculation unit 12 calculates first estimated transmission times Ax and Ay, and second estimated transmission times Px and Py for the users. Assuming that the shaping apparatus transmits a frame of the user X at time "1", for example, the OTIME calculation unit 12 calculates the first estimated transmission time Ax and the second estimated transmission time Px as follows:

$$Ax = (previous\ estimated\ transmission\ time) + INC = 1 + 2 = 3$$

$$Px = (previous\ estimated\ transmission\ time) + PINC = 1 + 1 = 2$$

When the frame rate of each user is not lower than the AFR (corresponding to time "1" to time "5" in FIG. 3), the frames of user X and user Y are transmitted at the first estimated transmission times Ax and Ay corresponding thereto.

When the frame rate of user Y becomes lower than the AFR and there is no frame to be transmitted (corresponding to time "6" and time "7" in FIG. 3), a conventional shaping apparatus would not have transmitted any frame at time "6" and time "7". However, the shaping apparatus 10 which has been described uses the second estimated transmission time P to transmit frames of user X at time "6" and time "7". At time "6" and time "7", the shaping apparatus 10 selects a user who has the earliest first estimated transmission time. A among users who have transmission-pending frames in their queues. In the current case, user X is selected. Then, the shaping apparatus 10 compares the second estimated transmission time P of the selected user with the current time. When the second estimated transmission time P matches the current time, or the second estimated transmission time indicates a past time compared with the current time, the shaping apparatus 10 transmits a frame of the selected user. As shown in FIG. 3, for example, after a frame of user X is transmitted at time "15", the OTIME calculation unit 12 calculates a second estimated transmission time Px of "6". Therefore, when the transmission determination unit 13 compares the second estimated transmission time Px with the current time at time "6", they match. Consequently, the transmission determination unit 13 instructs the frame-buffer management unit 15 to transmit a frame of the selected user X. In the same way, after the frame of user X is transmitted at time "6", the OTIME calculation unit 12 calculates a second estimated transmission time Px of "7". Therefore, the second estimated transmission time Px matches the current time also at time "7", and the transmission determination unit 13 again instructs the frame-buffer management unit 15 to transmit a frame of user X. The shaping apparatus 10 transmits the frames of user X at time "6" and time "7" in this way.

Since the shaping apparatus 10 uses the second estimated transmission time P calculated based on the PFR in this way, each user can use a frame rate which the other users are not using.

It is assumed here, for example, that the shaping apparatus 10 newly received a frame of user Y, and the frame of user Y is in the queue in the frame buffer 24 at time "8". In this case, among user X and user Y who have transmission-pending frames in their queues, the shaping apparatus 10 selects user Y because user Y has the earlier first estimated transmission time A. As shown in FIG. 3, since the OTIME storage memory 23 holds, at time "8", a first estimated transmission time Ay of "6", which was calculated by the OTIME calculation unit 12 at time "4", and it is earlier than a first estimated transmission time Ax of "9", the transmission determination unit 13 selects user Y. Then, the shaping apparatus 10 compares the second estimated transmission time P of the selected user with the current time. When the second estimated transmission time P matches the current time, or it is in the past with respect to the current time, the shaping apparatus 10 transmits a frame of the selected user. More specifically, since the second estimated transmission time Py read from the OTIME storage memory 23 is "5" and it indicates a time in the past compared with the current time, the transmission determination unit 13 instructs transmission of a frame of user Y. Therefore, the shaping apparatus 10 transmits a frame of user Y at time "8".

If user X and user Y have transmission-pending frames in their queues thereafter, the frames of these users are transmitted by the shaping apparatus 10 according to first estimated transmission times Ax and Ay calculated based on the AFRs (time "9" to time "12" in FIG. 3).

Figure 4:
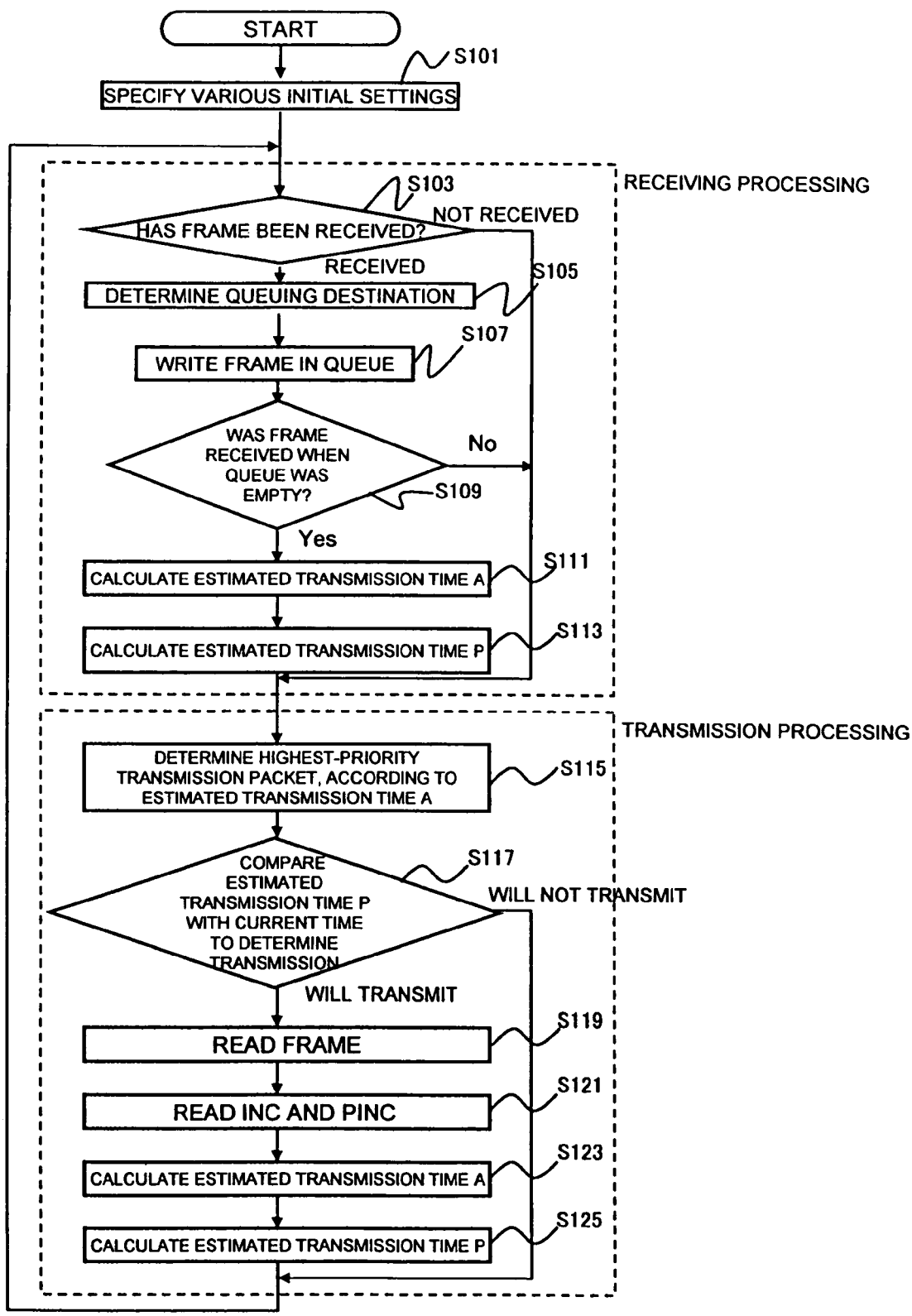
FIG. 4 is a flowchart of transmission and receiving processing performed by the shaping apparatus.

FIG. 4 is a flowchart of transmission and receiving processing performed by the shaping apparatus 10. The operation of the shaping apparatus 10 will be specifically described below according to the flowchart.

When the shaping apparatus 10 is activated due to the activation of the packet relay apparatus or for other reasons, the shaping apparatus 10 specifies various initial settings in step S101. For example, the shaping apparatus 10 stores the MFR and PFR specified for each user in the frame-rate-information storage memory 21, calculates the PINC, and stores it in the INC storage memory 22.

The MFR and PFR are determined according to the contract for each user. They are input into the packet relay apparatus together with the identifier of each user, for example, by the administrator (operator) from an administrator terminal connected to the packet relay apparatus. They can be input at any time during the activation time and operation time of the packet relay apparatus.

Then, the shaping apparatus 10 performs the following receiving processing and transmission processing at intervals corresponding to the above-described reference time (processing time). The receiving processing will be described first. The receiving interface 16 determines in step S103 whether a frame has been received. When the receiving interface 16 determines in step S103 that a frame has been received, the receiving interface 16 sends the received frame to the frame-buffer management unit 15. The receiving interface 16 also sends the header information of the received frame to the queuing-destination determination unit 14. When the receiving interface 16 determines in step S103 that a frame has not been received, the shaping apparatus 10 does not perform the following receiving processing, and starts the transmission processing.

When the queuing-destination determination unit 14 receives the header information of the frame from the receiving interface 16, the queuing-destination determination unit 14 determines in step S105 the queuing destination according to the received header information. For example, the queuing-destination determination unit 14 determines the queuing destination according to an identifier (such as VLAN ID) for identifying the user, included in the header information. In the shaping apparatus, a user number is assigned to each user to identify the user. Therefore, the queuing-destination determination unit 14 determines the user number as the destination queue. The queuing-destination determination unit 14 sends the determined queuing destination (user number) to the frame-buffer management unit 15.

When the frame-buffer management unit 15 receives the frame from the receiving interface 16, the frame-buffer management unit 15 writes the frame into the queue in the frame buffer 24 according to the queuing destination determined by the queuing-destination determination unit 14, in step S107. By the process of step S107, the frame is written into the queue corresponding to the user number. If frame writing generates a transmission-pending frame for the user, the frame-buffer management unit 15 may write, in the OTIME storage memory 23, a flag indicating that there is a transmission-pending frame for the user.

Then, the queuing-destination determination unit 14 determines in step S109 whether the frame was received when there was no transmission-pending frame in the queue corresponding to the user number determined in step S105. The queuing-destination determination unit 14 may receive from the frame-buffer management unit 15, information indicating that the frame-buffer management unit 15 wrote the frame in an empty queue. The queuing-destination determination unit 14 may check a flag indicating whether there is a transmission-pending frame stored in the OTIME storage memory before the frame-buffer management unit 15 writes the frame into the queue. Alternatively, the queuing-destination determination unit 14 may check the queue corresponding to the queuing destination determined in step S105 to determine whether there is a frame. When the queuing-destination determination unit 14 determines in step S109 that the frame was received when there was no frame in the queue, the queuing-destination determination unit 14 instructs the OTIME calculation unit 12 to calculate estimated transmission times. When the queuing-destination determination unit 14 determines in step S109 that the frame was received when there was a frame in the queue, the queuing-destination determination unit 14 gives no instruction to the OTIME calculation unit 12. In this case, the shaping apparatus 10 terminates the receiving processing, and starts the transmission processing.

When the OTIME calculation unit 12 receives the instruction from the queuing-destination determination unit 14, the OTIME calculation unit 12 calculates a first estimated transmission time A and a second estimated transmission time P in step S111 and step S113, respectively. The OTIME calculation unit 12 can set the first estimated transmission time A and the second estimated transmission time P to the earliest time when the received frame can be transmitted (such as the current time or the current time plus the reference time). The OTIME calculation unit 12 also stores the calculated first estimated transmission time A and second estimated transmission time P at the addresses corresponding to the determined user number in the OTIME storage memory 23.

The transmission processing will be described next.

The transmission determination unit 13 reads the first estimated transmission time A of each user, calculated by the OTIME calculation unit 12 from the OTIME storage memory 23, and determines the highest-priority user (user having the earliest first estimated transmission time A) for whom a frame is to be transmitted, in step S115. For example, the transmission determination unit 13 reads the flag indicating whether there is a transmission-pending frame, the flag being stored in the OTIME storage memory 23 for each user, reads the first estimated transmission time A of each user for whom the flag indicates that there is a transmission-pending frame from the OTIME storage memory 23, compares the read first estimated transmission time A, finds the user number corresponding to the earliest first estimated transmission time A, and determines the highest-priority user for whom a frame is to be transmitted.

Then, in step S117, the transmission determination unit 13 reads the second estimated transmission time P of the determined user from the OTIME storage memory 23 to determine whether the determined user is ready for transmission. For example, the transmission determination unit 13 compares the read second estimated transmission time P with the current time. When the read second estimated transmission time P matches the current time, or it indicates a time in the past compared with the current time, the transmission determination unit 13 determines that a frame of the determined user can be transmitted. When the transmission determination unit 13 determines in step S117 that the frame can be transmitted, the transmission determination unit 13 sends the user number of the determined user to the frame-buffer management unit 15 and instructs the frame-buffer management unit 15 to read and transmit a frame from the queue corresponding to the user number. The transmission determination unit 13 also outputs information indicating that the transmission has been instructed and the user number of the determined user to the OTIME calculation unit 12. When the transmission determination unit 13 determines in step S117 that the frame cannot be transmitted, the transmission processing at the current time is terminated. The shaping apparatus 10 executes the receiving processing from step S103 when the next processing time arrives.

When the frame-buffer management unit 15 receives the user number and the transmission instruction from the transmission determination unit 13, the frame-buffer management unit 15 reads the frame disposed at the top of the queue corresponding to the specified user number from the frame buffer 24, and transmits the frame through the transmission interface 17 in step S119. When the frame-buffer management unit 15 determines, when the frame-buffer management unit 15 transmits the frame, that the queue corresponding to the user number no longer has a transmission-pending frame, the frame-buffer management unit 15 may write a flag indicating that there is no transmission-pending frame, at the address corresponding to the user number in the OTIME storage memory 23.

When the OTIME calculation unit 12 receives from the transmission determination unit 13 information indicating that the transmission has been instructed and the user number of the determined user, the OTIME calculation unit 12 reads the INC and PINC corresponding to the user number from the INC storage memory 22 in step S121.

The OTIME calculation unit 12 uses the read INC to calculate a first estimated transmission time A according to the following expression in step S123.

First estimated transmission time $A$=(previous estimated transmission time)+INC The calculated first estimated transmission time A indicates the time when the next frame is to be transmitted from the queue corresponding to the user number. Then, the OTIME calculation unit 12 uses the read PINC to calculate a second estimated transmission time P according to the following expression.

Second estimated transmission time $P$=(previous estimated transmission time)+PINC The OTIME calculation unit 12 also stores the calculated first estimated transmission time A and second estimated transmission time P at the addresses corresponding to the received user number in the OTIME storage memory 23.

The shaping apparatus 10 repeatedly executes the processes of step S103 to step S125, described above.

Figure 5:
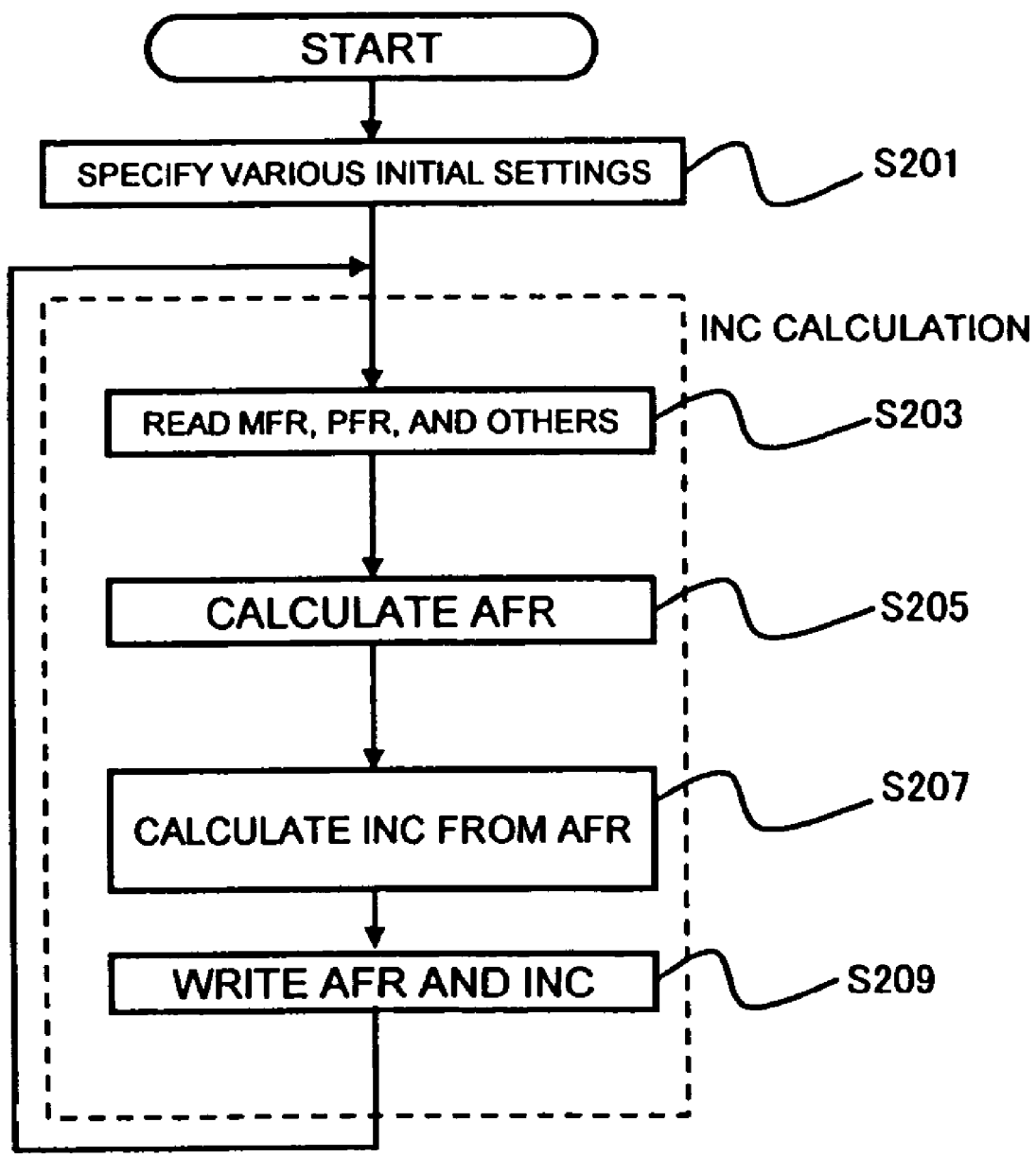
FIG. 5 is a flowchart of an INC calculation performed by an AFR calculation unit 11.

FIG. 5 is a flowchart of an INC calculation performed by the AFR calculation unit 11. The AFR calculation unit 11 periodically executes the INC calculation irrespective of (not in synchronization with) the above-described transmission and receiving processing.

When the shaping apparatus 10 is activated, the AFR calculation unit 11 specifies initial settings in step S201. For example, the AFR calculation unit 11 stores the maximum frame rate of the line, and the MFR and PFR specified for each user in the frame-rate-information storage memory and in other memories.

The AFR calculation unit 11 reads the MFR and PFR from the addresses corresponding to the user number of each user in the frame-rate-information storage memory 21 in step S203. The AFR calculation unit 11 also reads the maximum frame rate of the line which the user will use, from the frame-rate-information storage memory 21 or other memories. Then, the AFR calculation unit 11 uses the read MFR and/or PFR of each user to calculate the AFR for the user in step S205. For example, the AFR calculation unit 11 calculates the AFR according to the following expression such that the maximum frame rate of the line is divided and assigned to each user according to the MFR of the user.

AFR=(Maximum frame rate of the line used by the user)×(user MFR)/(sum of the MFRs of active users using the line)

If the AFR calculated for each user exceeds the PFR of the user, the AFR calculation unit 11 sets the AFR to the PFR. The AFR calculation unit 11 may calculate the AFR according to an expression other than that described above.

The AFR calculation unit 11 further calculates the INC for each user according to the following expression in step S207.

INC=(Maximum frame rate which the shaping apparatus can shape)/AFR

The AFR calculation unit 11 stores the INC calculated for each user at the address corresponding to the user number of the user in the INC storage memory 22 in step S209. The AFR calculation unit 11 also stores the AFR calculated for each user at the address corresponding to the user number of the user in the frame-rate-information storage memory 21 in step S209.

The AFR calculation unit 11 may execute the processes of step S203 to step S209, described above, for one user, and then the processes for each of the other users in turn.

In the above description, the shaping apparatus 10 has used VLAN ID included in the header information as an identifier for identifying the user; however, the shaping apparatus 10 may identify the user by using other appropriate identifiers, such as an IP address and MPLS label. Inside the shaping apparatus, the user number has been used to identify the user; however, an appropriate identifier (information) which can identify each user, other than the user number, may be used.

In the above description, frames transmitted and received by the shaping apparatus 10 each have the reference number of bytes; however, the shaping apparatus 10 can transmit and receive frames having a number of bytes different from the reference number of bytes. In this case, the OTIME calculation unit 12 calculates the first estimated transmission time A and second estimated transmission time P according to the following expressions.

First estimated transmission time $A$=(previous estimated transmission time)+INC×(number of bytes in the frame to be transmitted)/(reference number of bytes)

Second estimated transmission time $P$=(previous estimated transmission time)+PINC×(number of bytes in the frame to be transmitted)/(reference number of bytes)

Figure 6:
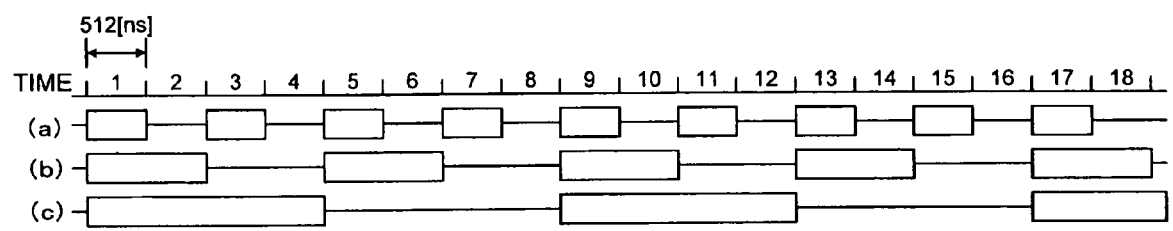
FIG. 6 is a view showing timing for transmission of frames having different numbers of bytes from a reference number of bytes.

FIG. 6 shows the timing when the shaping apparatus 10 transmits frames having different numbers of bytes from the reference number of bytes.

It is assumed here, for example, that the maximum frame rate of the line is 1 Gbps, the AFR is 500 Mbps, the INC is "2", and the reference number of bytes is 64. FIG. 6(a) shows the relationship between transmitted frames each having 64 bytes and time. FIG. 6(b) shows the relationship between transmitted frames each having 128 bytes and time. FIG. 6(c) shows the relationship between transmitted frames each having 256 bytes and time. In this way, even if the frames to be transmitted have different numbers of bytes, the shaping apparatus 10 can transmit the frames according to the AFR and PFR.

As described above, when the shaping apparatus 10 is used, any frame rate left unused due to a change in the frame rate of a user can be effectively used. For example, a frame rate conventionally left unused by any user when the frame rate of a user becomes lower than the AFR or MFR can be effectively used.

What is claimed is:

1. A traffic shaping apparatus for controlling an allowed transmission frame rate of user frames according to frame rates specified in advance, for each user who transmits and receives the user frames through a network, the traffic shaping apparatus comprising:

a plurality of frame queues, each provided for a corresponding user, for storing the user frames of the corresponding user;

a frame-rate storage section for storing a minimum transmission frame rate and a peak transmission frame rate specified for each user;

a transmission-interval calculation section for calculating an allowed transmission frame rate of user frames for each user by using the minimum transmission frame rate or the peak transmission frame rate, for calculating a reference transmission interval of the user frames for each user by using the calculated allowed transmission frame rate, and for calculating a minimum transmission interval for each user by using the peak transmission frame rate;

a transmission-interval storage section for storing the reference transmission interval and the minimum transmission interval for each user;

a time calculation section for calculating a first estimated transmission time for each user by using the reference transmission interval and for calculating a second estimated transmission time for each user by using the minimum transmission interval;

a time storage section for storing the first estimated transmission time and the second estimated transmission time for each user;

a determination section for determining the user having the earliest first estimated transmission time among one or more users corresponding to one or more frame queues where at least one user frame is stored, and for determining whether a user frame is to be transmitted according to the second estimated transmission time for the determined user;

a frame reading section for reading the user frame from the frame queue corresponding to the determined user when the determination section has determined that the user frame of the determined user is to be transmitted; and a transmission section for transmitting the read user frame.

2. A traffic shaping apparatus according to claim 1, wherein the transmission-interval calculation section calculates the minimum transmission interval when the peak transmission frame rate is specified for each user, periodically calculates the allowed transmission frame rate and the reference transmission interval for each user, and stores them in the transmission-interval storage section.

3. A traffic shaping apparatus according to claim 1, wherein the frame-rate storage section further stores the maximum frame rate of a line through which a user frame of each user is transmitted, and the transmission-interval calculation section calculates the allowed transmission frame rate for each user by using the maximum frame rate of the line and the minimum transmission frame rate.

4. A traffic shaping apparatus according to claim 3, wherein the transmission-interval calculation section calculates the allowed transmission frame rate for each user according to the following expression:

Allowed transmission frame rate of user=(maximum frame rate of the line through which a user frame of the user is to be transmitted)×(minimum transmission frame rate specified for the user)/(sum of minimum transmission frame rates of active users who transmit user frames through the line).

5. A traffic shaping apparatus according to claim 1, wherein the transmission-interval calculation section calculates the reference transmission interval for each user according to the following expression:

Reference transmission interval of user=(maximum frame rate which the traffic shaping apparatus can control)/(allowed transmission frame rate for the user).

6. A traffic shaping apparatus according to claim 1, wherein the transmission-interval calculation section calculates the minimum transmission interval for each user according to the following expression:

Minimum transmission interval of user=(maximum frame rate which the traffic shaping apparatus can control)/(maximum transmission frame rate for the user).

7. A traffic shaping apparatus according to claim 1, wherein the determination section instructs the time calculation section to calculate times when the determination section has determined that the user frame of the determined user is to be transmitted, and the time calculation section calculates the first estimated transmission time and the second estimated transmission time for the determined user and stores them in the time storage section when the time calculation section is instructed by the determination section.

8. A traffic shaping apparatus according to claim 7, wherein the time calculation section calculates the first estimated transmission time and the second estimated transmission time for each user according to the following expressions:

First estimated transmission time=previous estimated transmission time+reference transmission interval for the user, and Second estimated transmission time=previous estimated transmission time+minimum transmission interval for the user.

9. A traffic shaping apparatus according to claim 1, wherein the determination section determines that a user frame is to be transmitted when the second estimated transmission time for the determined user matches the current time or indicates a time in the past compared with the current time.

10. A traffic shaping apparatus according to claim 1, further comprising:

a receiving section for receiving a user frame;

an identification section for identifying the user for whom the user frame is to be transmitted or received, according to information included in the user frame; and a frame storage section for storing the user frame in the frame queue corresponding to the identified user.

11. A traffic shaping apparatus according to claim 10, wherein the identification section determines whether the user frame has been received in a state in which there is no user frame in the frame queue corresponding to the identified user, and when the identification section determines that the user frame has been received in said state, the identification section instructs the time calculation section to calculate times, and the time calculation section calculates the first estimated transmission time and the second estimated transmission time for the identified user and stores them in the time storage section when the time calculation section is instructed by the determination section.

12. A traffic shaping apparatus according to claim 11, wherein the time calculation section calculates the first estimated transmission time and the second estimated transmission time for each user according to the following expressions:

First estimated transmission time=current time+reference time, and

Second estimated transmission time=current time+reference time.

13. A traffic shaping method for controlling an allowed transmission frame rate of user frames according to frame rates specified in advance, for each user who transmits and receives the user frames through a network, the traffic shaping method comprising the steps of:

setting a minimum transmission frame rate and a peak transmission frame rate for each user;

calculating a minimum transmission interval for each user by using the peak transmission frame rate;

calculating an allowed transmission frame rate of user frames for each user by using the minimum transmission frame rate or the peak transmission frame rate;

calculating a reference transmission interval of the user frames for each user by using the allowed transmission frame rate;

calculating a first estimated transmission time for each user by using the reference transmission interval;

calculating a second estimated transmission time for each user by using the minimum transmission interval;

receiving a user frame for each user and storing it in association with the user;

determining the user having the earliest first estimated transmission time among one or more users for whom at least one user frame is stored;

determining whether a user frame is to be transmitted according to the second estimated transmission time of the determined user; and transmitting the user frame of the determined user when it has been determined that the user frame of the determined user is to be transmitted.

14. A traffic shaping method according to claim 13, wherein, in the step of calculating the minimum transmission interval, the minimum transmission interval is calculated when the peak transmission frame rate is specified for each user.

15. A traffic shaping method according to claim 13, wherein, in the steps of calculating the allowed transmission frame rate and the reference transmission interval, the allowed transmission frame rate and the reference transmission interval are periodically calculated for each user.

16. A traffic shaping method according to claim 13, wherein, in the steps of calculating the allowed transmission frame rate, the reference transmission interval, and the minimum transmission interval, the allowed transmission frame rate, the reference transmission interval, and the minimum transmission interval are calculated for each user according to the following expressions:

Allowed transmission frame rate of user=(maximum frame rate of the line through which a user frame of the user is to be transmitted)×(minimum transmission frame rate specified for the user)/(sum of minimum transmission frame rates of active users who transmit user frames through the line), Reference transmission interval of user=(maximum frame rate which the traffic shaping apparatus can control)/(allowed transmission frame rate for the user), and Minimum transmission interval of user=(maximum frame rate which the traffic shaping apparatus can control)/(maximum transmission frame rate for the user).

17. A traffic shaping method according to claim 13, wherein, in the step of transmitting the user frame, the first estimated transmission time and the second estimated transmission time of the determined user are further calculated.

18. A traffic shaping method according to claim 17, wherein, in the steps of calculating the first estimated transmission time and the second estimated transmission time, the first estimated transmission time and the second estimated transmission time are calculated according to the following expressions:

First estimated transmission time=previous estimated transmission time+reference transmission interval for the user, and Second estimated transmission time=previous estimated transmission time+minimum transmission interval for the user.

19. A traffic shaping method according to claim 13, wherein, in the step of determining whether the user frame is to be transmitted, it is determined that the user frame is to be transmitted when the second estimated transmission time of the determined user indicates the current time or a time in the past compared with the current time.

20. A relay apparatus connected to a plurality of lines, for relaying frames between the lines, comprising:

a plurality of interface sections each connected to at least one of the plurality of lines, for transmitting and receiving a frame to and from the line, the plurality of interface sections each comprising a frame buffer for temporarily storing the frame;

a relay section connected to the plurality of interface sections, for determining the interface section connected to a line through which the frame is to be transmitted, according to header information included in a frame received by the each interface sections, and for relaying the frame to the determined interface section; and a traffic shaping apparatus connected to at least one of the plurality of interface sections and to the relay section, for controlling an allowed transmission frame rate according to frame rates specified in advance, for each user who transmits and receives a frame through a line, and for transmitting a frame, the traffic shaping apparatus having:

a frame-rate storage section for storing a minimum transmission frame rate and a peak transmission frame rate specified for each user;

a transmission-interval calculation section for calculating an allowed transmission frame rate of frames for each user by using the minimum transmission frame rate or the peak transmission frame rate, for calculating a reference transmission interval of the frames for each user by using the calculated allowed transmission frame rate, and for calculating a minimum transmission interval for each user by using the peak transmission frame rate;

a transmission-interval storage section for storing the reference transmission interval and the minimum transmission interval for each user;

a time calculation section for calculating a first estimated transmission time for each user by using the reference transmission interval and for calculating a second estimated transmission time for each user by using the minimum transmission interval;

a time storage section for storing the first estimated transmission time and the second estimated transmission time for each user;

a determination section for determining the user having the earliest first estimated transmission time among one or more users for whom at least one frame is stored in the frame buffer, and for determining whether a frame is to be transmitted according to the second estimated transmission time of the determined user;

a frame reading section for reading the frame of the determined user from the frame buffer when the determination section has determined that the frame of the determined user is to be transmitted; and a transmission section for transmitting the read frame to one of the lines through one of the plurality of interface sections.

* * * * *